United States Patent [19]
Rehmat

[11] Patent Number: 5,753,189
[45] Date of Patent: May 19, 1998

[54] METHOD AND APPARATUS FOR CONTROLLING SULFUR CONCENTRATION IN LIQUID REDOX SULFUR REMOVAL PROCESSES

[75] Inventor: Amirali G. Rehmat, Darien, Ill.

[73] Assignee: Gas Research Institute, Chicago, Ill.

[21] Appl. No.: 729,741

[22] Filed: Oct. 7, 1996

Related U.S. Application Data

[63] Continuation of Ser. No. 446,108, May 19, 1995, abandoned.

[51] Int. Cl.$^6$ .............. G05D 7/00; B01D 50/00; B01D 47/00
[52] U.S. Cl. .............. 422/110; 422/172; 422/262; 96/181; 96/203; 55/223
[58] Field of Search .............. 422/168, 172, 422/177, 233, 262, 110; 96/181, 203; 423/220, 576.6, 576.5, 576.4, 573.1, DIG. 5; 55/223

[56] References Cited

U.S. PATENT DOCUMENTS

| | | | |
|---|---|---|---|
| 2,581,136 | 1/1952 | Odell | 23/3 |
| 2,682,444 | 6/1954 | Phillipps | 23/2 |
| 2,733,979 | 2/1956 | Haensel | 23/2 |
| 3,117,844 | 1/1964 | Bureau | 23/260 |
| 4,243,648 | 1/1981 | Fenton | 423/573 R |
| 4,283,379 | 8/1981 | Fenton et al. | 423/571 |
| 4,460,554 | 7/1984 | Shafer | 423/223 |
| 4,485,082 | 11/1984 | Blytas | 423/573 R |
| 4,496,371 | 1/1985 | Urban et al. | 48/197 R |
| 4,528,169 | 7/1985 | La Mori et al. | 423/231 |
| 4,705,676 | 11/1987 | Fong et al. | 423/567 A |
| 4,722,799 | 2/1988 | Ashbrook et al. | 210/722 |
| 4,830,734 | 5/1989 | Nagji et al. | 208/208 R |
| 4,859,436 | 8/1989 | Olson et al. | 423/221 |
| 4,931,262 | 6/1990 | Sonta et al. | 423/220 |
| 5,093,094 | 3/1992 | Van Kleeck et al. | 423/224 |
| 5,122,351 | 6/1992 | Hardison | 423/220 |
| 5,126,118 | 6/1992 | Hardison | 423/231 |
| 5,139,753 | 8/1992 | Hardison | 423/220 |
| 5,273,734 | 12/1993 | Sawyer et al. | 423/573.1 |
| 5,508,014 | 4/1996 | Rai | 423/224 |

FOREIGN PATENT DOCUMENTS

| | | |
|---|---|---|
| 474347 | 11/1975 | U.S.S.R. |
| 197708 | 8/1977 | U.S.S.R. |

OTHER PUBLICATIONS

"Bacteria help desulfurize gas", Hydrocarbon Processing, pp. 76-D to 76-F, May 1988.

*Primary Examiner*—Nina Bhat
*Attorney, Agent, or Firm*—Dick and Harris

[57] ABSTRACT

An apparatus and process for the removal of sulfur, in the form of hydrogen sulfide ($H_2S$), from gas, such as natural gas or industrial gas streams, in which the sulfur is removed and separated in the form of particulate elemental sulfur. The apparatus and process are advantageously configured so as to maintain control over the development of undesired concentrations of particulate sulfur in the precipitation catalyst solution with which the sulfur is separated from the gas stream.

6 Claims, 1 Drawing Sheet

METHOD AND APPARATUS FOR CONTROLLING SULFUR CONCENTRATION IN LIQUID REDOX SULFUR REMOVAL PROCESSES

This application is a continuation of application Ser. No. 08/446,108, May 19, 1995 now abandoned.

BACKGROUND OF THE INVENTION

1. Field of the Invention

The present invention relates generally to liquid redox processes for the removal of sulfur from gases, such as natural gas.

2. The Prior Art

Hydrogen sulfide ($H_2S$) is often encountered in gas streams, such as when natural gas is being extracted from the ground, or in various industrial processes. In the presence of oxygen, $H_2S$ can form various oxides which are not only pollutants (which can contribute to acid rain), but also can be corrosive or otherwise damaging to equipment, such as pipelines and other machinery.

Processes for the removal of $H_2S$ from gas streams are known. A basic agent such as an amine has also been employed, in which case the amine is regenerated for reuse as absorbent by heat, for example by steam. A variety of non-regenerable processes using Fe-based solids, liquid-based processes using caustic triazine, or nitratrites are also widely employed. For economic reasons, the regenerable processes such as amines and liquid redox are more attractive as total sulfur increases, for example, above 50–100 lbs. per day. When conversion to elemental sulfur is desired for environmental or regulatory reasons, liquid redox processes are preferred when total sulfur is less than 5–25 tons per day. Above this capacity, amine or other solvents, followed by various amine offgas treating processes (which may also include liquid redox processes), after application of the Claus process, are preferred due to lower costs.

Generally, in a typical liquid redox process, an oxidation-reduction ("redox") system is used in which the $H_2S$-laden gas ("sour" gas) is exposed to a sulfide precipitation catalyst material (for example, a metal oxide, in which the metal cation changes from a higher valence state to a lower state, upon reaction with the $H_2S$), and the gas, now with a substantially reduced level of $H_2S$ ("sweet" gas) is then piped onward to its intended use.

After passing through the absorber, at least a portion of the sulfur will have precipitated out of the precipitation catalyst solution as elemental sulfur. The precipitation catalyst solution is then sent to some form of regeneration apparatus, such as an oxidizer, so as to restore the metal cation in the precipitation catalyst solution to the desired higher valence state, so that the solution may be returned to the absorber to absorb more $H_2S$ from the gas stream.

Some processes, such as that disclosed in Sawyer et al., U.S. Pat. No. 5,273,734, withdraw the elemental sulfur from the spent absorber solution prior to exposure of the spent solution to the regenerator. In other processes, such as that disclosed in Fenton et al., U.S. Pat. No. 4,283,379, the sulfur is drawn off after oxidization of the precipitation catalyst.

In a liquid redox process such as the BIO-SR Process (TM), circulation of liquid chemicals plays an important role in not only preventing sulfur buildup and subsequent blockage, but also on the size of the oxidizer. The primary reason for blockages formed in the absorber section of the sulfur removal system, and for the formation of foam in any flash/slurry tank, is excessive particulate sulfur concentrations in the precipitation catalyst liquid. This can lead to difficulties in the smooth transportation of the sulfur in the precipitation catalyst liquid stream, as well as difficulties in the circulation of the precipitation catalyst itself.

While increased circulation of liquid precipitation catalyst through the absorber section of the sulfur recovery system would decrease the concentration of solid sulfur particulate in the precipitation catalyst liquid passing in the absorber, the increased circulation will result in inefficient utilization of reactants present in the liquid, and will require that a larger oxidizer, for the expected sulfur removal volume, be provided. This is because a certain minimum residence time in the oxidizer is required in order to fully regenerate the precipitation catalyst. For every increase in circulation rate, the area of the oxidizer will have to be increased directly in proportion to the precipitation catalyst circulation rate increase.

In such processes, it is desirable to control the concentration of elemental sulfur so as to reduce or preclude the excessive lay-down of elemental sulfur in the equipment in locations other than the designated removal sites.

It is further desirable to control the concentration of elemental sulfur in the precipitation catalyst solution circuit, so as to reduce the likelihood of foaming, which can tend to reduce the efficiency of the sulfide removal process.

SUMMARY OF THE INVENTION

An apparatus and process for the removal of sulfur, in the form of hydrogen sulfide ($H_2S$), from gas, such as natural gas or industrial gas streams, in which the sulfur is removed and separated in the form of particulate elemental sulfur. The apparatus and process are advantageously configured so as to maintain control over the development of undesired concentrations of particulate sulfur in the precipitation catalyst solution with which the sulfur is separated from the gas stream.

BEST MODE FOR PRACTICING THE INVENTION

Figure 1:
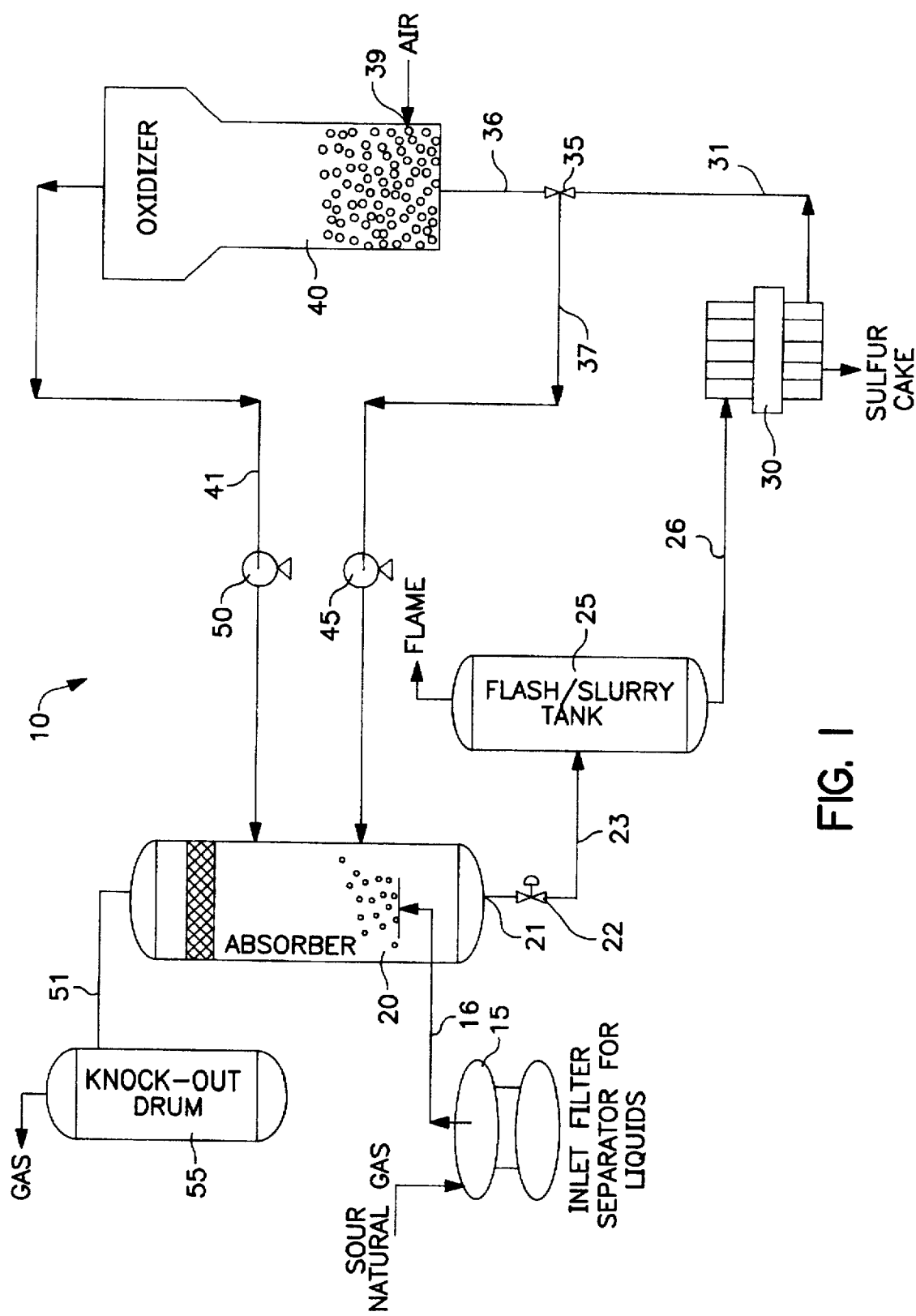
FIG. 1 is a schematic representation of a liquid redox hydrogen sulfide ($H_2S$) removal process, according to the present invention.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

FIG. 1 represents an embodiment of the present invention, schematically a liquid redox system 10. While a particular version of liquid redox process is discussed with regard to the present invention, it is to be understood that the principles of the present invention may be applied to all liquid redox processes which precipitate elemental sulfur as particulate sulfur in solution, and still be within the scope of the present invention.

For the purposes of the present disclosure, the BIO-SR system chemistry may be considered to be the system employed.

System 10 includes inlet filter/liquid separator 15, connected by conduit 16 to absorber 20. At the bottom of absorber 20 is outlet 21. Flow from absorber 20 is regulated by flow control valve 22, via conduit 23 to flash/slurry tank 25 (present, if the absorber 20 is operating at greater than atmospheric pressure, which is typical). As described in further detail, particulate sulfur-bearing partially spent precipitation catalyst liquid is piped via 26 to filter press 30, a percentage of the particulate sulfur in solution is filtered out in a substantially continuous process and pressed into a filter cake (along with some precipitation catalyst solution), for use elsewhere.

The sulfur-reduced precipitation catalyst solution is then carried via 31 to junction 35, at which point, unlike prior art systems, the flow of solution is divided. Conduit 36 carries a portion of the precipitation catalyst liquid to oxidizer 40 for regeneration of the precipitation catalyst liquid. Oxygen, in the form of ambient air, is introduced into oxidizer 40, at 39 in sufficient quantity to ensure the reaction of all of the catalyst material, to return to the higher valence state, for reuse in absorber 20. Conduit 37 carries a portion of the precipitation catalyst directly back to absorber 20, the flow being assisted by pump 45. The regenerated precipitation catalyst liquid exits oxidizer 40 via conduit 41, and is returned, assisted by pump 50, to absorber 20. The sweet (desulfurized) gas passes via conduit 51 to knock-out drum 55 where any residual moisture, such as absorbent solution, present in the sweet gas is removed, and the gas is then piped onward toward its utilization or other destination.

An example of a process operated according to the present invention is as follows. The numerical values are representative values, and may be readily varied by one of ordinary skill in the art, and having the present disclosure before them, to accommodate greater or lesser production/desulfurization rates.

In the example discussed hereinafter, assume that a known liquid redox process is employed in which, in the absorber, the $H_2S$ contained in the incoming sour gas reacts with trivalent ferric iron ($Fe^{+3}$) contained in the solution to precipitate elemental sulfur according to the following reaction:

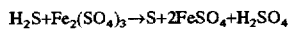

The elemental sulfur is removed from the solution, and the solution is directed to an oxidizer, in which oxygen from air is provided to reoxidize the ferrous iron according to the following reaction:

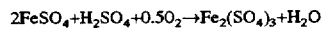

The reactions taking place in the absorber and the oxidizer depend upon the concentration of the iron species in the solution. For a reasonable rate of absorber reaction, the concentration of ferric iron going into absorber 20 may be maintained at 25 kg/m$^3$ and sulfur 30 precipitation can be maintained until the concentration drops down to 10 kg/m$^3$.

Referring back to FIG. 1, presume that the incoming sour gas at 11 is contaminated by 3000 parts per million (ppm) of $H_2S$. Assume that the volumetric flow rate of the sour gas to be treated is 226,630 cubic meters per day. Thus, the total sulfur to be extracted is 38.48 kilograms/hour.

Accordingly, each cubic meter of precipitation catalyst solution in conduit 41 is capable of removing 4.28 kilograms of sulfur.

For a sulfur removal rate of 38.48 kilograms per hour, the minimum effective circulation rate between absorber 20 and oxidizer 40 is 38.48 kg/h/4.28 kg S=approx. 9.0 cubic meters per hour. The sulfur concentration in the spent solution exiting at 21 would be 4.28 kilograms per cubic meter.

As previously stated, a certain minimum residence time in the oxidizer 40 is required, in order to achieve regeneration of the precipitation catalyst fluid. This translates into a practical maximum linear velocity of the precipitation catalyst liquid through the oxidizer 40. For the system 10 described herein, a maximum linear velocity of 0.2 millimeters per second is a standard value for a liquid redox process, such as described hereinabove. For the minimum circulation rate determined above, the diameter of the functional portion of the oxidizer 40 must be approximately 4 meters.

Under the conditions of the described example, there is substantial potential for the development of a sulfur laydown problem in absorber 20, as well as potential foaming in the flash tank 25. In order to prevent laydown in the absorber 20 and foaming in the flash tank 25, the concentration of particulate sulfur in those sections must be kept below 1 kilogram per cubic meter (an empirically obtainable value which is typical for the mechanical requirements of such liquid redox systems).

To achieve 1 kg/m$^3$, if direct circulation between the absorber 20 and oxidizer 40 is maintained (that is, no diversion at junction 35), the circulation rate of the working solution would have to be increased to 4.28×9=38.52 m$^3$/h. If the linear velocity through the oxidizer 40 is maintained at 0.2 millimeters per second, the diameter of the oxidizer 40 would have to be increased to 8.25 meters.

In addition, it must be remembered that whatever oxidizer is selected will have a fixed diameter, meaning that a maximum possible flowrate of spent solution through the oxidizer will be established, and if further reduction in sulfur concentration is to be obtained, a larger diameter oxidizer would have to be installed.

The practice of the present invention, so as to maintain the desired flow rates, without having to increase the oxidizer size is as follows. The total flow rate into the absorber 20, so as to keep the concentration in the absorber 20 down to 1 kg per cubic meter, is maintained at 38.48 cubic meters per hour. The flow is split coming out of the absorber 20, and in particular, after filter press 30.

Since the stream coming out of filter press 30 is substantially spent precipitation catalyst liquid, the concentration of the Fe 3+ cation is 10 kg per cubic meter at most. This is also, therefore the concentration which is in line 37 which bypasses oxidizer 40 and is directly returned to absorber 20. In order to have effective absorption of the sulfur in absorber 20, therefore, the concentration of Fe 3+ coming out of oxidizer 40 should be maintained at the 25 kg per cubic meter level previously discussed.

In order to achieve the desired Fe 3+ concentration in the precipitation catalyst coming out of the oxidizer 40, and still maintain the oxidizer diameter at the originally calculated 4 meters, the maximum flow rate of precipitation catalyst through the oxidizer 40 that is needed is approximately 9.0 cubic meters per hour. This means that of the total 38.52 cubic meters per hour of precipitation catalyst solution which is circulating through the absorber 20, 29.52 cubic meters per hour are being diverted at 35 and sent via conduit 37 directly back to absorber 20, preferably to a location separate from and below the point of return of the regenerated precipitation catalyst liquid.

The foregoing example (and approximate numerical values) are based upon the chemistry employed in the liquid redox sulfur removal system known as BIO-SR, developed by NKK. Depending upon the chemistry of the liquid redox sulfur removal system to which the present invention is being applied, the specific ratio of precipitation catalyst which is being diverted from the oxidizer, directly back to the absorber, will vary, as a function of the residence time which is required in the oxidizer, the flow rate and $H_2S$ concentration of the gas being "cleaned", and so on, variables which may be readily accommodated by a practitioner of ordinary skill in the art having the present disclosure before them.

The present invention is believed to have the following advantages over prior art gas desulfurization processes, in addition to reduction in sulfur laydown and foaming: 1) maximum utilization of the liquid redox solution; 2) control of the size of the oxidizer needed. In addition the present inventive process is believed to be useful in systems operating at 1 to 100 atmospheres or higher. The present process can be used for liquid redox processes utilizing chelating agents as well as those employing non-chelating agents to catalyze reaction of the sulfur in the absorber.

In summary, the present invention comprises, in part, a process for substantially removing hydrogen sulfide ($H_2S$) from a gas stream. A stream of gas containing $H_2S$ in a known concentration, is directed to a first chamber at a known rate. A quantity of solution, containing an agent which in the presence of $H_2S$ will cause the sulfur to precipitate out in the form of particulate elemental sulfur is placed in the first chamber. The agent will be altered by chemical reaction as a result.

The stream of gas is caused to intermingle with the solution. The gas, from which $H_2S$ has been substantially removed, is drawn off from the first chamber. The particulate sulfur containing solution is directed from the first chamber to a filter, by which at least a portion of the particulate sulfur is separated from the solution.

As the solution departs from the filter, the flow is divided. A portion of the flow is sent directly back to the absorber. Another portion is sent onward to the oxidizer, for restoration of the sulfur precipitation catalyst in the solution to a concentration sufficient to achieve precipitation. After the catalyst has been restored, the solution is directed from the oxidizer to the absorber for reuse.

In a preferred embodiment of the invention, the process further comprises the steps of determining a minimum concentration of the first agent necessary to be maintained in the solution in the first chamber in order to cause the substantially total precipitation of the particulate sulfur from the gas being directed to the first chamber, as a function of the known rate of flow of the gas, and the known concentration of $H_2S$, into the first chamber, when the second chamber which is employed has known dimensions and permits a known maximum rate of flow of the solution therethrough; determining a maximum concentration of particulate sulfur which is desired to be maintained in the first chamber, and, in turn, in the solution which is drawn off from the first chamber; determining the rate at which the particulate bearing solution must be withdrawn from the first chamber, in order to maintain the desired maximum concentration of particulate sulfur in the first chamber; and determining the relative proportions of solution which, following passage through the filter, must be diverted to the second chamber and directly back to the first chamber, respectively, as a function of the rate at which the particulate bearing solution must be withdrawn from the first chamber, the maximum concentration of sulfur particulate to be maintained in the first chamber, and the minimum concentration of first agent to be maintained in the first chamber.

The present invention may also comprise an apparatus for substantially removing $H_2S$ from a gas stream, in which the concentration of particulate sulfur in the working solution is controlled.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

I claim:

1. An apparatus for substantially removing hydrogen sulfide ($H_2S$) from a gas stream, comprising:

an absorber;

means for directing a stream of gas containing $H_2S$ in a known concentration, to the absorber at a known rate;

a quantity of solution, operably disposed in the absorber;

wherein the solution is provided with means for causing the sulfur to precipitate out in the form of particulate elemental sulfur, the means being altered by chemical reaction as a result;

means for causing the stream of gas containing $H_2S$ to intermingle with the solution, and, in turn, the means for causing sulfur to precipitate out;

means for drawing off from the absorber, gas from which $H_2S$ has been substantially removed;

a filter for separating at least a portion of the particulate elemental sulfur from the solution;

means for withdrawing the solution, containing particulate elemental sulfur from the absorber and transporting the solution, to the filter;

means for dividing the flow of solution from the filter into two streams;

means for directing one of said two streams directly back to said absorber from which the stream of spent solution initially exited, substantially without altering the chemical composition of the solution, relative to its composition as it leaves the filter, operably associated with the means for dividing the flow;

an oxidizer;

means for restoring the means for causing the sulfur to precipitate in the solution to the chemical state present in the absorber, operably disposed in the oxidizer;

means for directing the other of said two streams to the oxidizer; and means for directing the other of the two streams, containing the restored means for causing sulfur to precipitate, from the oxidizer to the absorber.

2. The apparatus according to claim 1, wherein the oxidizer has known dimensions and permits a known maximum rate of flow of the solution therethrough, further comprising:

control means for determining a minimum concentration of the means for causing precipitation of sulfur necessary to be maintained in the solution in the absorber in order to cause the substantially total precipitation of the particulate sulfur from the gas being directed to the absorber, as a function of the known rate of flow of the gas, and the known concentration of $H_2S$, into the absorber.

3. The apparatus according to claim 2, further comprising:

control means for determining a maximum concentration of particulate sulfur which is desired to be maintained in the absorber, and, in turn, in the solution which is drawn off from the absorber.

4. The apparatus according to claim 3, further comprising:

control means for determining the rate at which particulate bearing solution must be withdrawn from the absorber, in order to maintain the desired maximum concentration of particulate sulfur in the absorber.

5. The apparatus according to claim 4, further comprising:

control means for determining the relative proportions of solution which, following passage through the filter, must be diverted to the oxidizer and directly back to the absorber, respectively, as a function of the rate at which the particulate bearing solution must be withdrawn from the absorber, the maximum concentration of sulfur particulate to be maintained in the absorber, and the minimum concentration of first agent to be maintained in the absorber.

6. An apparatus for substantially removing hydrogen sulfide ($H_2S$) from a gas stream, comprising:

a single absorber;

means for directing a stream of gas containing $H_2S$ in a known concentration, to the absorber at a known rate;

a quantity of solution, operably disposed in the absorber;

wherein the solution is provided with means for causing the sulfur to precipitate out in the form of particulate elemental sulfur, the means being altered by chemical reaction as a result;

means for causing the stream of gas containing $H_2S$ to intermingle with the solution, and, in turn, the means for causing sulfur to precipitate out;

means for drawing off from the absorber, gas from which $H_2S$ has been substantially removed;

a filter for separating at least a portion of the particulate elemental sulfur from the solution;

means for withdrawing the solution, containing particulate elemental sulfur from the single absorber and transporting the solution, to the filter;

means for dividing the flow of solution from the filter into two streams;

means for directing one of said two streams directly back to said single absorber from which the stream of spent solution initially exited, operably associated with the means for dividing the flow;

an oxidizer;

means for restoring the means for causing the sulfur to precipitate in the solution to the chemical state present in the absorber, operably disposed in the oxidizer;

means for directing the other of said two streams to the oxidizer; and means for directing the other of the two streams, containing the restored means for causing sulfur to precipitate, from the oxidizer back to the single absorber.

* * * * *